United States Patent
Zou et al.

(10) Patent No.: US 10,747,989 B2
(45) Date of Patent: Aug. 18, 2020

(54) SYSTEMS AND/OR METHODS FOR ACCELERATING FACIAL FEATURE VECTOR MATCHING WITH SUPERVISED MACHINE LEARNING

(71) Applicant: Software AG, Darmstadt (DE)

(72) Inventors: Yide Zou, Saarbruecken (DE); Kevin Muench, Saarbruecken (DE)

(73) Assignee: Software AG, Darmstadt (DE)

( * ) Notice: Subject to any disclaimer, the term of this patent is extended or adjusted under 35 U.S.C. 154(b) by 133 days.

(21) Appl. No.: 16/106,701

(22) Filed: Aug. 21, 2018

(65) Prior Publication Data
US 2020/0065563 A1    Feb. 27, 2020

(51) Int. Cl.
G06K 9/62    (2006.01)
G06K 9/00    (2006.01)
G06N 3/08    (2006.01)

(52) U.S. Cl.
CPC ..... *G06K 9/00288* (2013.01); *G06K 9/00228* (2013.01); *G06K 9/00268* (2013.01); *G06K 9/6215* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 5,442,716 A | * | 8/1995 | Otsu ........................ G06K 9/52 |
| | | | 382/181 |
| 7,319,779 B1 | * | 1/2008 | Mummareddy ... G06K 9/00288 |
| | | | 382/118 |
| 7,372,981 B2 | * | 5/2008 | Lai ..................... G06K 9/00268 |
| | | | 382/118 |

(Continued)

FOREIGN PATENT DOCUMENTS

CN    106529402 A    *    3/2017

OTHER PUBLICATIONS

SphereFace: Deep Hypersphere—Recpgnition, Weiyang Liu et al., IEEE, 1063-6919, 2017, pp. 6738-6746 (Year: 2017).*

(Continued)

*Primary Examiner* — Jayesh A Patel
(74) *Attorney, Agent, or Firm* — Nixon & Vanderhye PC

(57) ABSTRACT

A face recognition neural network generates small dimensional facial feature vectors for faces in received images. A multi-task learning classifier network receives generated vectors and outputs classifications for the corresponding images. The classifications are built by respective sub-networks each comprising classification layers arranged in levels. The layers in at least some levels receive as input intermediate outputs from an immediately upstream classification layer in the same sub-network and in each other sub-network. After training, a resultant facial feature vector corresponding to an input image is received from the neural network. Resultant classifiers for the input image are received from the classifier network. A database is searched for a subset of reference facial feature vectors having associated classification features matching the resultant classifiers. Vector matching identifies which one(s) of the reference facial feature vectors in the subset of reference facial feature vectors most closely match(es) the resultant facial feature vector.

25 Claims, 8 Drawing Sheets

(56) References Cited

U.S. PATENT DOCUMENTS

| | | | | |
|---|---|---|---|---|
| 7,561,741 | B2* | 7/2009 | Song | G06F 3/017 382/107 |
| 7,587,069 | B2* | 9/2009 | Movellan | G06K 9/00248 382/118 |
| 8,498,491 | B1* | 7/2013 | Steffens | G06K 9/6292 382/224 |
| 8,694,444 | B2* | 4/2014 | Faddoul | H04L 51/12 706/12 |
| 9,412,009 | B2* | 8/2016 | Myers | G06K 9/00288 |
| 9,691,007 | B2* | 6/2017 | Irie | G06K 9/00288 |
| 9,811,718 | B2* | 11/2017 | Sun | G06K 9/00281 |
| 9,928,448 | B1* | 3/2018 | Merler | H05K 999/99 |
| 10,339,177 | B2* | 7/2019 | Tang | G06K 9/6232 |
| 10,474,883 | B2* | 11/2019 | Yu | G06K 9/00288 |
| 10,528,800 | B2* | 1/2020 | Liu | G06K 9/00248 |
| 2002/0159627 | A1* | 10/2002 | Schneiderman | G06K 9/3241 382/154 |
| 2005/0265607 | A1* | 12/2005 | Chang | G06K 9/6293 382/224 |
| 2006/0104504 | A1* | 5/2006 | Sung | G06K 9/00281 382/159 |
| 2007/0071290 | A1* | 3/2007 | Shah | G06K 9/00288 382/118 |
| 2008/0205750 | A1* | 8/2008 | Porikli | G06T 7/20 382/159 |
| 2008/0317298 | A1* | 12/2008 | Shah | G06K 9/00268 382/118 |
| 2009/0046901 | A1* | 2/2009 | Kittler | G06K 9/00288 382/118 |
| 2009/0060288 | A1* | 3/2009 | Myers | G06K 9/00288 382/118 |
| 2009/0196464 | A1* | 8/2009 | Dimitrova | G06K 9/627 382/118 |
| 2010/0217743 | A1* | 8/2010 | Ueki | G06K 9/00221 706/52 |
| 2010/0235400 | A1* | 9/2010 | Myers | G06K 9/00288 707/802 |
| 2010/0290510 | A1* | 11/2010 | Heller | H04L 27/122 375/222 |
| 2010/0329517 | A1* | 12/2010 | Zhang | G06K 9/00248 382/118 |
| 2010/0329544 | A1* | 12/2010 | Sabe | G06K 9/6256 382/159 |
| 2011/0058743 | A1* | 3/2011 | Myers | G06F 16/5838 382/190 |
| 2011/0123071 | A1* | 5/2011 | Shah | G06K 9/4604 382/118 |
| 2011/0206246 | A1* | 8/2011 | Wolf | G06N 5/04 382/118 |
| 2012/0087552 | A1* | 4/2012 | Lee | G06K 9/00275 382/118 |
| 2012/0140982 | A1 | 6/2012 | Sukegawa et al. | |
| 2012/0233159 | A1* | 9/2012 | Datta | G06F 16/532 707/728 |
| 2014/0169673 | A1* | 6/2014 | Liu | G06K 9/6218 382/170 |
| 2015/0324368 | A1* | 11/2015 | Datta | G06F 16/24578 707/723 |
| 2016/0048741 | A1* | 2/2016 | Nguyen | G06K 9/00624 382/159 |
| 2016/0132718 | A1* | 5/2016 | Park | G06K 9/3275 382/118 |
| 2016/0148079 | A1* | 5/2016 | Shen | G06N 3/0454 382/157 |
| 2017/0026836 | A1* | 1/2017 | Samangouei | G06K 9/00281 |
| 2017/0061250 | A1* | 3/2017 | Gao | G06N 3/0454 |
| 2017/0132458 | A1* | 5/2017 | Short | G06K 9/00255 |
| 2017/0147868 | A1* | 5/2017 | Sun | G06K 9/00288 |
| 2017/0147905 | A1* | 5/2017 | Huang | G06K 9/6232 |
| 2017/0351905 | A1* | 12/2017 | Wang | G06K 9/00241 |
| 2018/0121714 | A1* | 5/2018 | Liang | G06K 9/00 |
| 2018/0137343 | A1* | 5/2018 | Liu | G06K 9/00241 |
| 2018/0150684 | A1* | 5/2018 | Wang | G06K 9/6256 |
| 2018/0211099 | A1* | 7/2018 | Ranjan | G06K 9/6267 |
| 2019/0005632 | A1* | 1/2019 | Huang | G06T 11/60 |
| 2019/0034814 | A1* | 1/2019 | Amer | G06K 9/6234 |
| 2019/0042866 | A1* | 2/2019 | Mostafa | G06K 9/00926 |
| 2019/0065833 | A1* | 2/2019 | Wang | G06K 9/00261 |
| 2019/0102528 | A1* | 4/2019 | Beacham | H04L 9/3231 |
| 2019/0294900 | A1* | 9/2019 | Li | G06K 9/00892 |
| 2020/0034645 | A1* | 1/2020 | Fan | G06N 3/0454 |

OTHER PUBLICATIONS

An overview of Multi-Task learning—Networks, Sebastain Ruder, arXiv1706,05098v1, Jun. 15, 2017, pp. 1-14 (Year: 2017).*

A novel Multi-Task—Facial attribute Prediction, Mingxing Duan et al., arXiv:1804.02810v1, Apr. 9, 2018, pp. 1-10 (Year: 2018).*

Representative learning—Perspective, Yoshua Bengio et al., IEEE, 0162-8628, 2013, pp. 1-31 (Year: 2013).*

Joint Face Detection and Alignment using Multitask—Networks, Kaipeng Zhang et al., IEEE, 1070-9908, 2016, pp. 1499-1503 (Year: 2016).*

Weiyang Liu et al., "SphereFace: Deep Hypersphere Embedding for Face Recognition," retrieved Aug. 15, 2018, 9 pages. http://openaccess.thecvf.com/content_cvpr_2017/papers/Liu_SphereFace_Deep_Hypersphere_CVPR_2017_paper.pdf.

Donghyun Kim et al., "Deep 3D Face Identification," retrieved Aug. 15, 2018, 10 pages.

Feng Wang et al., "NormFace: L2 Hypersphere Embedding for Face Verification," Jul. 26, 2017, 11 pages. https://arxiv.org/pdf/1704.06369.pdf.

Xianbiao Qi et al., "Face Recognition via Centralized Coordinate Learning," Jan. 17, 2018, 14 pages. https://arxiv.org/pdf/1801.05678.pdf.

Yong-Sheng Chen et al., "Fast Algorithm for Nearest Neighbor Search Based on a Lower Bound Tree," Jul. 2001, 8 pages. https://people.cs.nctu.edu.tw/~yschen/papers/ICCV01-kNN.pdf.

Josh Reiss et al., "Efficient Multidimensional Searching Routines for Music Information Retrieval," retrieved Aug. 15, 2018, 9 pages. http://eecs.qmul.ac.uk/~josh/documents/ReissAucouturierSandler-ISMIR2001.pdf.

Ying-Ho Liu et al., "Fast Vector Matching Methods and Their Applications to Handwriting Recognition," retrieved Aug. 15, 2018, 5 pages https://www.iis.sinica.edu.tw/papers/fchang/1763-F.pdf.

Wikipedia—Principal Component Analysis, retrieved Aug. 15, 2018, 20 pages. https://en.wikipedia.org/wiki/Principal_component_analysis.

Wikipedia—Curse of Dimensionality, retrieved Aug. 15, 2018, 6 pages. https://en.wikipedia.org/wiki/Curse_of_dimensionality.

Forrest N. Iandola et al., "SqueezeNet: AlexNet-Level Accuracy with 50x Fewer Parameters and <0.5MB Model Size," Nov. 4, 2016, 13 pages. https://arxiv.org/pdf/1602.07360.pdf.

Qiong Cao et al., "VGGFace2: A dataset for Recognising Faces Across Pose and Age," May 13, 2018, 11 pages. https://arxiv.org/pdf/1710.08092.pdf.

Gary B. Huang et al., "Labeled Faces in the Wild: A Database for Studying Face Recognition in Unconstrained Environments," retrieved Aug. 15, 2018, 11 pages. http://vis-www.cs.umass.edu/papers/lfw.pdf.

Kaipeng Zhang et al., "Joint Face Detection and Alignment Using Multi-Task Cascaded Convolutional Networks," retrieved Aug. 15, 2018, 5 pages. https://arxiv.org/ftp/arxiv/papers/1604/1604.02878.pdf.

DeepScale/SqueezeNet, retrieved Aug. 21, 2018, 1 page. K. Zhang and Z. Zhang and Z. Li and Y. Qiao. Joint Face Detection and Alignment Using Multitask Cascaded Convolutional Networks. IEEE Signal Processing Letters, 2016.

TensorFlow, retrieved Aug. 21, 2018, 6 pages. https://js.tensorflow.org/.

Yandong Wen et al., "A Discriminative Feature Learning Approach for Deep Face Recognition," retrieved Aug. 15, 2018, 17 pages.

Laurens van der Maaten et al., "Visualizing Data Using t-SNE," Nov. 2008, 27 pages. http://www.jmlr.org/papers/volume9/vandermaaten08a/vandermaaten08a.pdf.

(56) References Cited

OTHER PUBLICATIONS

Wikipedia—Softmax Function, retrieved Aug. 15, 2018, 5 pages. https://en.wikipedia.org/wiki/Softmax_function.
Kaiming He et al., "Delving Deep into Rectifiers: Surpassing Human-Level Performance on ImageNet Classification," Feb. 6, 2015, 11 pages. https://arxiv.org/pdf/1502.01852.pdf.
Sergey Ioffe et al., "Batch Normalization: Accelerating Deep Network Training by Reducing Internal Covariate Shift," Mar. 2, 2015, 11 pages. https://arxiv.org/pdf/1502.03167.pdf.
Dropout: A Simple Way to Prevent Neural Networks from Overfitting, Jun. 2014, 30 pages. http://jmlr.org/papers/v15/srivastava14a.html.
Sebastian Ruder, "An Overview of Multi-Task Learning in Deep Neural Networks," Jun. 15, 2017, 14 pages. https://arxiv.org/pdf/1706.05098.pdf.
Ishan Misra et al., "Cross-stitch Networks for Multi-task Learning," Apr. 12, 2016, 10 pages. https://arxiv.org/pdf/1604.03539.pdf.
Wikipedia—Standard Score, retrieved Aug. 15, 2018, 7 pages. https://en.wikipedia.org/wiki/Standard_score.
Quora—"In Keras, What is a 'Dense' and a 'Dropout' Layer?" retrieved Aug. 21, 2018, 4 pages. https://www.quora.com/In-Keras-what-is-a-dense-and-a-dropout-layer.
Wikipedia—Hyperparameter (Machine Learning), 3 pages. https://en.wikipedia.org/wiki/Hyperparameter_(machine_learning), Aug. 21, 2018.
Wikipedia—Artificial Neuron, retrieved Aug. 21, 2018, 6 pages. https://en.wikipedia.org/wiki/Artificial_neuron.

\* cited by examiner

SYSTEMS AND/OR METHODS FOR ACCELERATING FACIAL FEATURE VECTOR MATCHING WITH SUPERVISED MACHINE LEARNING

TECHNICAL FIELD

Certain example embodiments described herein relate to machine-based facial recognition techniques. More particularly, certain example embodiments described herein relate to techniques for accelerating facial feature vector matching via supervised learning, e.g., in connection with facial recognition technology.

BACKGROUND AND SUMMARY

Artificial intelligence is used in a variety of contexts. For example, facial recognition (or face recognition) oftentimes makes use of artificial intelligence techniques. Computerized facial recognition technology has many useful applications including, for instance, automatic identification of potential security threats in airports and other locations, in mobile and other computing platforms in connection with biometric authentication techniques, etc. Facial recognition is even becoming popular in more commercial applications such as, for example, payment authentication.

With recent advancements in the computer science field of deep learning, state-of-the-art face recognition techniques have been able to take advantage of metric learning. This approach typically involves learning a discriminative large-margin facial feature vector representation with a convolutional neural network, and using this vector representation to compare the facial features of a given image with faces within databases. In the authentication context, for example, in contrast with more traditional username and password based authentication where the system only compares the password provided by a known user (e.g., because the username is specified and thus the system "knows" who the user is or is purporting to be), face recognition systems do not know who the user is or is purporting to be. As a result, such systems typically try to find the best vector match in a database and determine whether the similarity exceeds a threshold. It will be appreciated, of course, that such vector matching is used in a variety of contexts beyond simply the authentication context, e.g., as noted above.

In a nutshell, many state-of-the-art face recognition algorithms represent facial features as a vector, such that the same person has a similar representation and the vectors of different persons are highly discriminative. Although the dimensions of vectors oftentimes are restricted by carefully designed convolutional neural networks and dimensionality reduction techniques like Principal Component Analysis, the final feature vectors are still high dimensional. For example, the "SphereFace Deep Hypersphere Embedding for Face Recognition" paper describes extracting facial features from the output of the first fully connected layer of the convolutional neural network, which is a 512-dimensional vector. The final representation is obtained by concatenating the original facial features and horizontally flipped features. The cosine distance metric and nearest neighbor classifier are used for face identification.

As another example approach, "Deep 3D Face Identification" involves a facial feature representation that is a 4096-dimensional vector that is normalized by taking the square root of each element. Then, Principal Component Analysis is performed to reduce the dimensions, facilitating a comparison of the vectors with linear searching and cosine similarity.

Somewhat similarly, "NormFace L2 Hypersphere Embedding for Face Verification" involves extract features from both the frontal face and its mirror image, and merging the two features by element-wise summation. Principal Component Analysis is then applied, and a similarity score is computed using the cosine distance of two features.

As still another example, in "Face Recognition via Centralized Coordinate Learning," the trained network generates two 374-dimensional feature vectors from a pre-aligned image and its corresponding flipped image. These two vectors are averaged and then normalized into a unit-length vector. The similarity score between two face images is computed by the cosine distance of feature vectors.

Conventional vector matching algorithms like those that use KD-trees work well with low-dimensional vectors. Yet facial feature vectors commonly have hundreds or many hundreds (and sometimes thousands) of dimensions, as shown above. Conventional algorithms and data structures in general cannot support this dimensionality, and it simply is or becomes "too much" for many of them. Moreover, a linear or brute force search oftentimes will be too slow for large databases.

In a related regard, many conventional vector matching algorithms arrange vectors in a particular way, which can be a convenient reference for later searching. Although such approaches typically are much faster than linear searches, they unfortunately still suffer from the so-called curse of dimensionality, which makes them generally unsuitable for high dimensional vector matching. As is known, the curse of dimensionality refers to various phenomena that arise when analyzing and organizing data in high-dimensional spaces that do not occur in low-dimensional settings and, in general, relates to the fact that, when the dimensionality of a space increases, the volume of the space increases so fast that the available data becomes sparse, presenting problems in terms of data organization, etc.

For instance, an often-used way to cluster multiple dimensional data is KD-trees. Those kinds of trees take a value on one dimension and separate all data into categories that are either higher or lower than the separation value. As a result, the data are separated based on one dimension. For each separation, this process is repeated with a different dimension. This will be done with all dimensions. However, KD-trees do not work well with higher dimensions, especially when the amount of data points are low (one normally wants to have a minimum of $2^k$ data points where k is the number of dimensions). In the case of face recognition, feature vectors are usually have many hundreds of dimensions; thus, even for a 100-dimensional vector more than 1e30 ($2^{100}$) data values are needed. Therefore, these conventional approaches generally are not applicable for this type of application.

It will be appreciated that it would be desirable to improve upon current vector matching techniques, especially in the facial recognition context. For example, it will be appreciated that it would be desirable to reduce the search space, thereby speeding up the facial recognition and/or improving its accuracy.

One aspect of certain example embodiments relates to addressing the above-described and/or other issues. For example, one aspect of certain example embodiments relates to an approach to accelerating facial feature vector matching, e.g., to speed up the facial recognition and/or improve its accuracy. Certain example embodiments leverage the special properties of facial feature vectors and supervised machine learning techniques. In certain example embodiments, latency associated with the facial feature vector matching can be greatly improved, potentially resulting in one-quarter or similar amount of space to be searched (e.g., depending on how many classifiers are used, as explained in greater detail below), without having to rely on (but still allowing for) a reduction of the vector size.

Certain example embodiments advantageously improve computerized facial recognition techniques by combining hard and soft parameter sharing techniques in connection with two different neural networks that are a part of the same overall system. Certain example embodiments advantageously use small size facial feature vectors as neural network inputs and reduce the search space by implementing multi-task learning classifiers.

In certain example embodiments, a facial recognition system is provided. An electronic interface is configured to receive images including faces. A data store stores reference facial feature vectors and associated classification features. Processing resources including at least one hardware processor and a memory coupled thereto are configured to support: a face recognition neural network configured to generate facial feature vectors for faces in received images; and a multi-task learning classifier network configured to receive facial feature vectors generated by the face recognition neural network and output a plurality of classifications based on the facial feature vectors for the corresponding images. The classifications are built by respective sub-networks each comprising a plurality of classification layers arranged in levels. The classification layers in at least some of the levels receive as input intermediate outputs from an immediately upstream classification layer in the same sub-network and an immediately upstream classification layer in each other sub-network. The processing resources are configured to control at least a part of the facial recognition system to at least: receive from the face recognition neural network a resultant facial feature vector corresponding to an input image received over the electronic interface; receive from the multi-task learning classifier network a plurality of resultant classifiers for the input image and based at least in part on the resultant facial feature vector; search the data store for a subset of reference facial feature vectors, the subset of reference facial feature vectors having associated classification features matching the resultant classifiers; and perform vector matching to identify which one(s) of the reference facial feature vectors in the subset of reference facial feature vectors most closely match(es) the resultant facial feature vector.

In certain example embodiments, a facial recognition system is provided. An electronic interface is configured to receive images including faces. A data store stores reference facial feature vectors and associated classification features. Processing resources including at least one hardware processor and a memory coupled thereto are configured to support: a face recognition neural network configured to generate facial feature vectors for faces in received images, the generated facial feature vectors having fewer than 512 dimensions; and a multi-task learning classifier neural network configured to receive facial feature vectors generated by the face recognition neural network and output a plurality of classifications based on the facial feature vectors for the corresponding images. The classifications are built by respective sub-networks each comprising a plurality of classification layers arranged in levels. The classification layers in at least some of the levels receive as input intermediate outputs from an immediately upstream classification layer in the same sub-network and an immediately upstream classification layer in each other sub-network. The face recognition neural network and the multi-task learning classifier neural network are separately trained. The multi-task learning classifier neural network is trained with data from a subset of training images used to train the face recognition neural network, the subset including classification labels corresponding to classifications that can be output by the multi-task learning classifier neural network.

In certain example embodiments, a facial recognition system is provided. A camera is configured to receive images including faces. A database stores reference facial feature vectors and associated classification features. Processing resources including at least one hardware processor and a memory coupled thereto are configured to support: a face recognition neural network configured to generate facial feature vectors for faces in received images, the generated facial feature vectors having fewer than 512 dimensions; and a multi-task learning classifier neural network configured to receive facial feature vectors generated by the face recognition neural network and output a plurality of classifications based on the facial feature vectors for the corresponding images. The classifications are built by respective sub-networks that implement soft parameter sharing therebetween. The processing resources are configured to control at least a part of the facial recognition system to at least: receive from the face recognition neural network a resultant facial feature vector corresponding to an input image received from the camera; receive from the multi-task learning classifier neural network a plurality of resultant classifiers for the input image and based at least in part on the resultant facial feature vector; search the database for a subset of reference facial feature vectors, the subset of reference facial feature vectors having associated classification features matching the resultant classifiers; and identify which one(s) of the reference facial feature vectors in the subset of reference facial feature vectors most closely match(es) the resultant facial feature vector. The face recognition neural network and the multi-task learning classifier neural network are separately trained. The multi-task learning classifier neural network is trained with data from a subset of training images used to train the face recognition neural network, with the subset including classification labels corresponding to classifications that can be output by the multi-task learning neural classifier network.

According to certain example embodiments, the generated facial feature vectors have fewer than 512 dimensions, e.g., 100-300 dimensions.

According to certain example embodiments, the sub-networks may be binary and/or other classifiers, and there may be two, three, or more different sub-networks in different example embodiments. According to certain example embodiments, there may be two, three, four, or more levels in the various different sub-networks.

According to certain example embodiments, the processing resources help facilitate hard parameter sharing between the face recognition neural network and the multi-task learning classifier network, and soft parameter sharing between sub-networks in the multi-task learning classifier network. For example, cross-stitching may enable the facial recognition techniques to implement both shared and non-shared layers.

According to certain example embodiments, the input image may be received in connection with an authentication request; the reference facial feature vectors and associated classification features in the data store may correspond to known users; and/or the processing resources may be further configured to control at least a part of the facial recognition system to at least determine whether the one(s) of the reference facial feature vectors in the subset of reference facial feature vectors most closely match(es) the resultant facial feature vector exceeds a defined threshold and, conditioned upon that determination being satisfied, issue an authentication command.

According to certain example embodiments, the vector matching may be performed in connection with a cosine similarity calculation; and the processing resources may be further configured to control at least a part of the facial recognition system to at least determine whether the one(s) of the reference facial feature vectors in the subset of reference facial feature vectors most closely match(es) the resultant facial feature vector exceeds a defined threshold and, conditioned upon that determination being satisfied, issue a predefined command or instruction.

According to certain example embodiments, the face recognition neural network and the multi-task learning classifier network may be separately trained. For example, the processing resources may be further configured to control at least a part of the facial recognition system to at least normalize training images used to train the face recognition neural network and/or the multi-task learning classifier network (e.g., by detecting and cutting face areas for the training images, and selectively resizing the cut face areas so that the cut face areas are of a common size, etc.); to train the multi-task learning classifier network with data from a subset of the training images that includes classification labels corresponding to classifications that can be output by the multi-task learning classifier network; etc.

According to certain example embodiments, the face recognition neural network may be a convolutional neural network trainable in connection with a softmax loss function, or variant thereof.

In addition to the features of the previous paragraphs, counterpart methods, non-transitory computer readable storage media tangibly storing instructions for performing such methods, executable computer programs, and the like, are contemplated herein, as well. Similarly, servers, client devices, and the like, usable in connection with the systems laid out in the previous paragraphs, also are contemplated herein.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Figure 1:
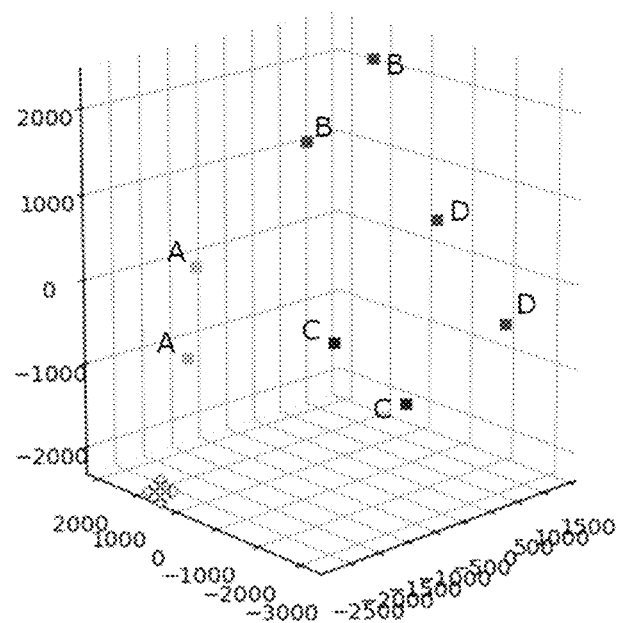
FIG. 1 is a representation of eight feature vectors from four different people in 3D space.

Certain example embodiments described herein relate to techniques for accelerating facial feature vector matching via supervised learning, e.g., in connection with facial recognition technology. Certain example embodiments help to speed up the facial feature vector matching using a relatively small vector representation (e.g., a smaller vector representation that is smaller than the face recognition algorithms mentioned above). In addition, a multi-task learning neural network in certain example embodiments takes the feature vectors as input and classifies them with different facial properties. By using these additional classifications, it is possible to greatly reduce the search space, e.g., before a linear search or the like.

With respect to the feature vectors, certain example embodiments use a 128-dimensional vector to represent the facial features. The vectors may be created using the SqueezeNet or other suitable neural network architecture, potentially without implementing a dimension reduction technique like Principle Component Analysis. As shown in greater detail below, it is possible to achieve a sufficiently high accuracy for facial recognition applications, even with this (or similar) low dimensional representation.

The supervised learning techniques of certain example embodiments include a database or other similar structure. For instance, in an authentication system leveraging facial recognition, the database may include entries for registered users. The database of certain example embodiments may include other face appearance related biologic and/or other information such as, for example, the gender, age, and/or other characteristics of the persons stored in the database. If such information is not available, it may in some instances be generated with machine learning tools such as, for example, the multi-task learning neural network described in greater detail below. Manual validation and/or correction operations may be performed in some instances. With such additional information stored in the database, it becomes possible to reduce the number of vectors that need to be compared during vector matching operations.

Certain example embodiments use a neural network that helps to recognize the user's gender and age group. Its inputs are facial feature vectors instead of images. This has been found to work, as these vector representations are retrieved from a high level layer of the face recognition convolutional neural network. Besides the discriminative large-margin property that is important for face recognition, they are also good "abstract" representations of facial images (e.g., in the sense that they are extracted from concrete images and may apply to many different types of images). In this case, it is possible to consider the convolutional neural network as a feature extractor that extracts facial feature from images, and the extracted features can be used in other facial tasks such as, for example, gender and/or age classification, etc.

The classification tasks in certain example embodiments provide varying degrees of relevant information. For example, a person with a bald head is normally male and old. Certain example embodiments use a multi-task learning technique including a single neural network for all classifiers. It advantageously uses shallow layers for each classifier because the feature vectors representation are already quite abstract (e.g., in the sense that they are decoupled from specific images) which, in turn, means that the information stored can be much smaller than conventional gender and age classifiers that oftentimes take images as inputs. Also as a result, not much additional computation is introduced during face recognition.

Example Implementation

Details concerning an example implementation are provided below. It will be appreciated that this example implementation is provided to help demonstrate concepts of certain example embodiments, and aspects thereof are non-limiting in nature unless specifically claimed. For example, descriptions concerning example libraries, vector extractors, classifiers, data sets usable for training and/or evaluation, component configurations, etc., are non-limiting in nature unless specifically claimed.

Datasets are used for training and evaluating the face recognition convolutional neural network and/or the gender-age classifier. In certain example embodiments, different datasets may be used for these and/or other purposes. For instance, the VGGFace2 Dataset was used to train a convolutional neural network for generating large margin facial feature vectors for face recognition task. The VGGFace2 Dataset is a large-scale face dataset that contains 3.31 million images of 9,131 people, with an average of 362.6 images for each person. Images are downloadable from Google Image Search and have many variations in terms of pose, age, illumination, ethnicity, and profession (e.g., actors, athletes, politicians). In this dataset, 2,000 images have both gender labels (female/male) and age labels (young/old). In an example implementation, 90% of these images was used to train a gender-age classifier and evaluate its accuracy with the remaining 10% images. To evaluate the accuracy of the face recognition network, the Labeled Faces in the Wild (LFW) dataset was used. The LFW dataset includes face photographs designed for studying the problem of unconstrained face recognition. The data set contains more than 13,000 images of faces collected from the web.

Preprocessing may be performed on the training and/or evaluation dataset images in certain example embodiments. Such preprocessing may include, for example, face alignment, separation (cropping) of the face area from the original image, resizing images to a common size, etc. Different algorithms, including the MTCNN algorithm, may be used to perform this and/or other types of preprocessing.

Certain example embodiments include processing resources configured as a neural network for generating facial feature vectors, and processing resources configured as a neural network for multi-task learning classification. With respect to the neural network for generating facial feature vectors, during training, its inputs are face images from the VGGFace2 dataset, and the outputs of the last dense layer are extracted as facial feature vectors. The neural network for multi-task learning classification takes as input the facial feature vectors that are extracted from the first neural network, and its outputs are probabilities of different classifications. The one with the highest probability is chosen as the result.

These components may be trained separately in certain example embodiments. This approach is advantageous because not all face images in the VGGFace2 dataset have the necessary labels for training the second network. After the first network is trained (e.g., with all 3.31 million images), it is used to generate the facial feature vectors of the images with labels that the second network needs (there are only 2,000 such images in VGGFace2 dataset). These vectors are then used to train the second network. To train multiple classifiers directly in accordance with conventional approaches, more than 2,000 images are needed. However, it is possible to use the approach set forth above to successfully train both parts with high accuracies, even though only 2,000 images are used. It will be appreciated that the inputs are facial feature vectors instead of images, in at least certain example embodiments. This has been found to work, as these vector representations are retrieved from a high-level layer of the face recognition convolutional neural network. Besides the discriminative large-margin property that typically is important for face recognition, they are also good "abstract" representations of facial images, so the network uses shallow layers for each classifier because the feature vector representations are already quite abstract, which accordingly do not need too much training data.

It would be desirable to be able to implement the neural networks on a variety of different clients including, for example, lightweight client devices using web browsers. The SqueezeNet convolutional neural network architecture, for example, may be used, as it has a very small size but still provides good accuracy. After training, the network is deployed to the client. For example, TensorFlow.js may be used for web browser inclusive deployments.

The convolutional neural network may be trained with a special loss function called center loss in certain example embodiments. Center loss extends the standard softmax loss function by including the Euclidean distance between the feature vectors and their cluster centers. While the softmax loss separates the feature vectors of different people, the extended part of this loss function makes them even more discriminative. After training, the feature vectors are very close for the same person and far away for different people.

Center loss has been described as using a 512-dimensional vector to represent the final facial features. Certain example embodiments change this number of neurons of the last dense layer to make the generated feature vectors have only 128 dimensions. As is known, a dense layer is a fully connected layer or, in other words, a layer where each unit or neuron is connected to each neuron in the next layer. Also as is known, neurons are artificial neurons are elementary units in an artificial neural network. An artificial neuron receives one or more inputs and sums them to produce an output. This change advantageously speeds up the vector matching while still having a sufficiently high accuracy for facial recognition tasks.

FIG. 1 is a representation of eight feature vectors from four different people in 3D space. That is, eight photos of four different people were taken. The four different people are labeled in FIG. 1 with A, B, C, and D, and there are two photos of each person. In order to show the 128-dimensional facial feature vectors, the representations were transformed into three dimensions with the t-SNE algorithm. Each feature vector represents a photo and is shown as a point in the 3D space. Labels describe their "belongings." Although a lot of information is lost during the dimension reduction, it nonetheless can be seen that vectors of the same person are close to one another whereas vectors of different people are far away from each other.

To increase the amount of training data, data augmentation was used on input images. The data augmentation included random crops, flips, rotations, and brightness changes with respect to the input images. It will be appreciated that some or all of these and/or other changes could be made for data augmentation purposes in different example embodiments.

Parameters were initialized with the He initialization, with the bias initialized with zero. See K. He et al., "Delving Deep into Rectifiers: Surpassing Human-Level Performance on ImageNet Classification," Microsoft Research (2015) for an example of the types of initialization that may be used in connection with certain example embodiments.

In order to try to avoid overfitting, batch normalization and L2 regularization was applied. See S. Ioffe and C. Szegedy, "Batch Normalization: Accelerating Deep Network Training by Reducing Internal Covariate Shift," Google (2015) for a discussion of one kind of batch normalization that may be used in connection with certain example embodiments. Implementing dropout has kept the probability at 0.8. See N. Srivastava et al., "Dropout: A Simple Way to Prevent Neural Networks from Overfitting," Journal of Machine Learning Research 15 (2014), for a description one way that overfitting can be addressed. Dropout is a regularization technique, which aims to reduce the complexity of the model with the goal to prevent overfitting. Using dropout, randomly certain units (neurons) in a layer are randomly deactivated with a certain probability.

Figure 2:
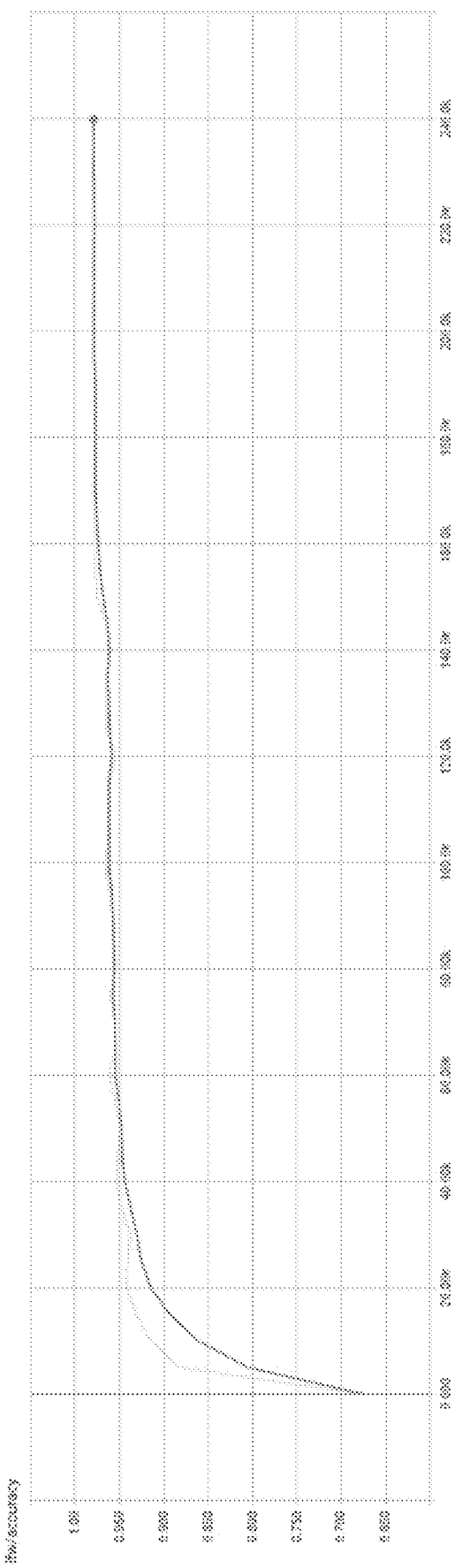
FIG. 2 shows the accuracy of the training approach of certain example embodiments for facial feature vectors.
Figure 3:
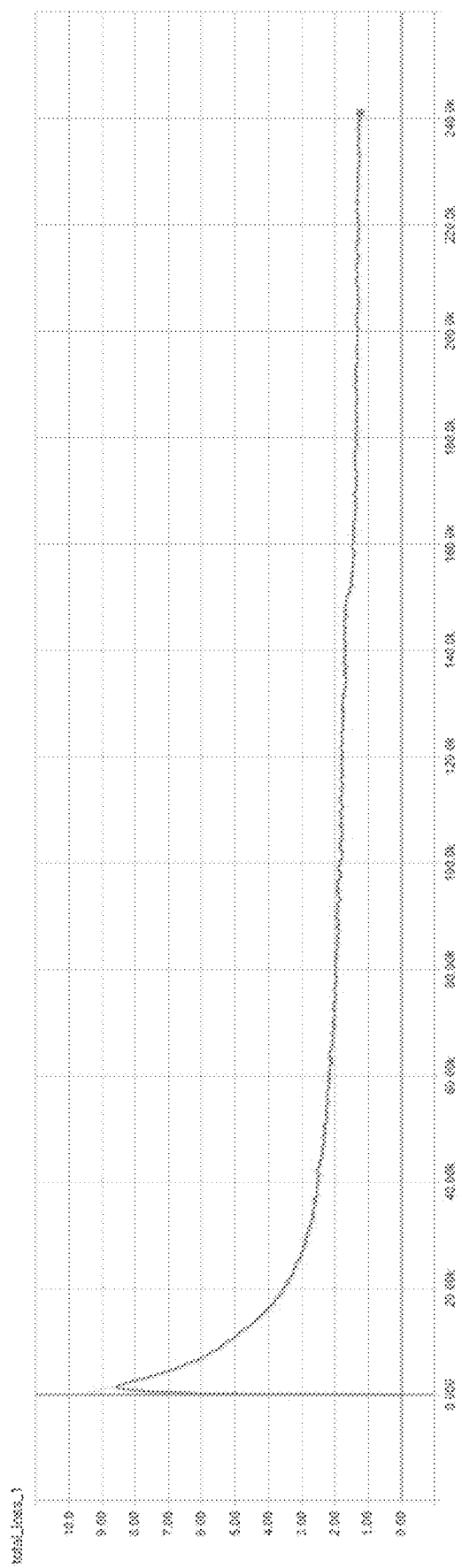
FIG. 3 shows the loss function value of the training process for of certain example embodiments for facial feature vectors.

The learning rate was adjusted manually during the training. The rate was decreased 1/10 (although it will be appreciated that different rate reductions may be used in different example embodiments, and that the rates may be reduced according to a constant, logarithmic, or other scale). The training in this example took 270 periods with the batch size of 100 (although other periods and/or batch sizes may be used in different example embodiments). The rate and batch size were machine learning hyperparameters, set manually based on test results/experience. FIGS. 2-3 discussed in greater detail below demonstrate why the latter was chosen, namely, the improvement rate reached saturation.

After training, the built network was tested with the LFW dataset. It was found to have an accuracy of 97.80%. In this regard, FIG. 2 shows the accuracy of the training approach of certain example embodiments for facial feature vectors, and FIG. 3 shows the loss function value of the training process for of certain example embodiments for facial feature vectors. The x-axis in FIGS. 2-3 are the number of training iterations. The faint lines are the true value, and the bold line is average (smoothed) value.

For feature vector matching, conventional algorithms and structures such as KD-trees are not appropriate as they do not work well with high-dimensional vectors. Even the reduction to the smaller size representation used in certain example embodiments (e.g., 128 dimensions instead of 512) has been found to be too much for conventional approaches.

In addition to "normal" high dimensional vectors, the feature vectors of certain example embodiments also describe human faces. This property of a vector describing (multiple) human faces can be used to build multiple facial classifiers which, in turn, can be used to provide additional information to aid in vector matching.

Certain example embodiments implement multi-task learning. In one example, two simple binary classifiers were built based on the extracted facial features. The first classifier helps distinguish between gender (female/male), and the second classifier helps distinguish age groups (young/old). It will be appreciated that one or both of these and/or other classifiers may be used in different example embodiments.

Instead of building separate neural networks for the different classifiers, a single neural network was built to classify them all together. This technique is called multi-task learning. This technique is advantageous because it aids in simplifying the models. It also is advantageous because training different tasks together can improve each individual task. There are several reasons for this. First, when the training data is limited and has a high dimensionality (e.g., 128-dimensional facial feature vectors), it could be difficult for a single model to distinguish between important and unimportant features. Multi-task learning helps the models to focus on the important features while other tasks can provide additional evidence. Second, although some important features are easy to learn for some tasks but hard for others, multi-task learning can help the models to learn such features indirectly. Third, different tasks can introduce different "noise" patterns. This approach advantageously forces models to learn a more general solution and in turn reduces the risk of overfitting. Multi-task learning thus can be considered as a "regularizer."

Figure 4:
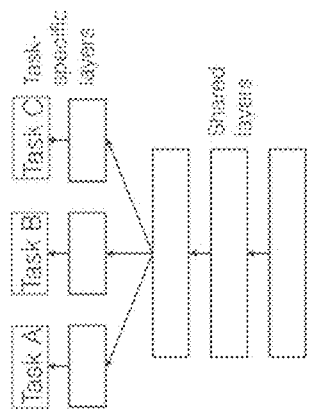
FIG. 4 is a diagram showing hard parameter sharing for multi-task learning in deep neural networks.

In the context of Deep Learning, there are typically two types of multi-task learning methods: hard parameter sharing and soft parameter sharing. With hard parameter sharing, the network shares its early layers for all tasks, and its later layers are task specific and isolated. This approach has a lower risk of overfitting, but needs human decisions about shared layers. FIG. 4 is a diagram showing hard parameter sharing for multi-task learning in deep neural networks, with the lower layers being shared and the upper layers being task-specific.

Figure 5:
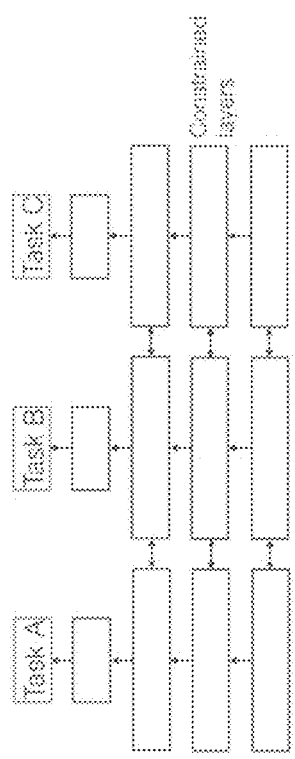
FIG. 5 is a diagram showing soft parameter sharing for multi-task learning in deep neural networks.

On the other hand, a network with soft parameter sharing has separated sub-networks for each task. There are connections between these sub networks to share information across the tasks. Compared with the hard parameter sharing, it is a more end-to-end approach. The network can choose its optimal architecture for sharing automatically. FIG. 5 is a diagram showing soft parameter sharing for multi-task learning in deep neural networks. As can be seen in FIG. 5, constrained lower layers communicate with one another.

Figure 6:
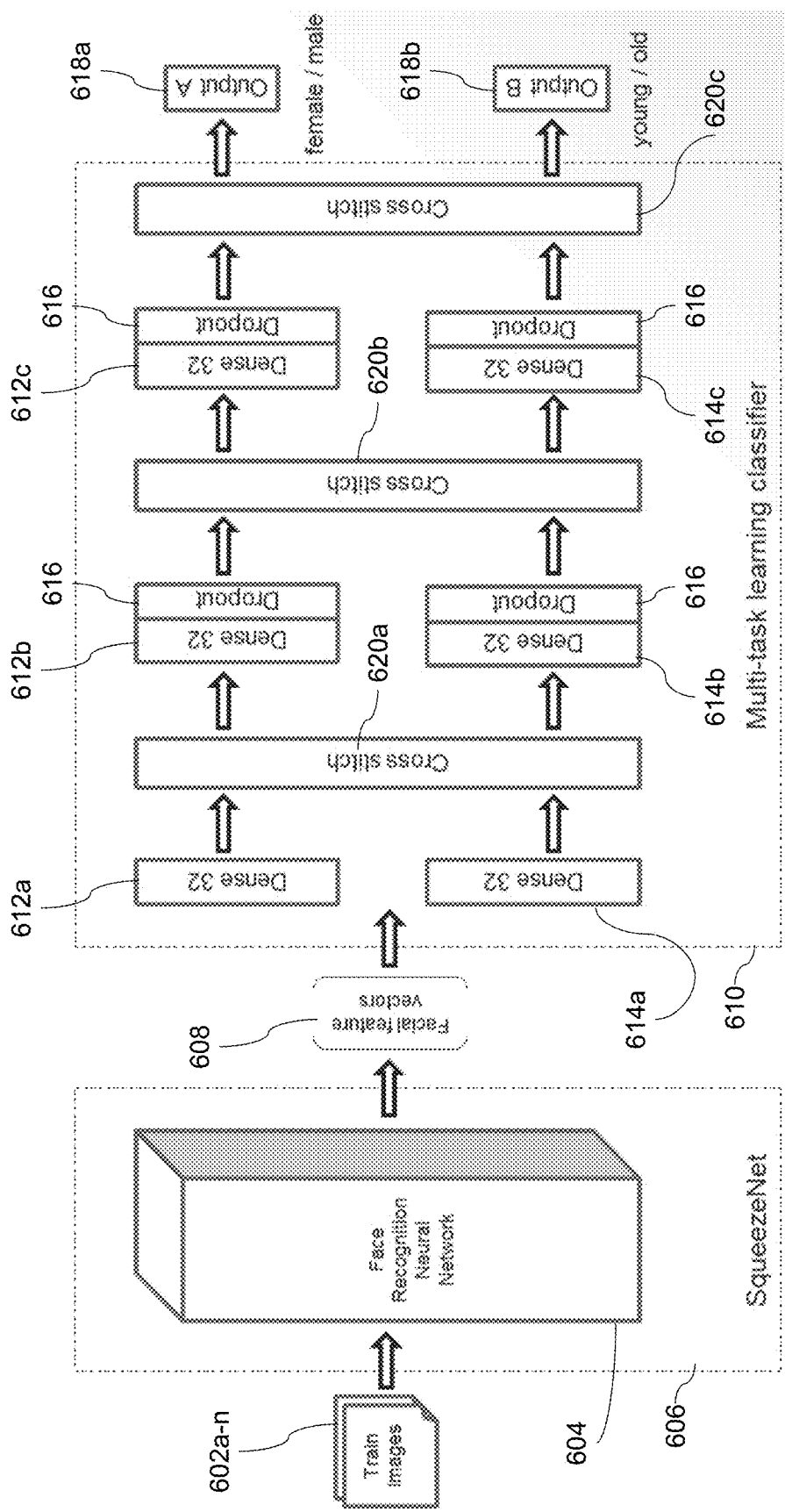
FIG. 6 is a block diagram of a network architecture for multi-task learning with two classifiers, in accordance with certain example embodiments.

FIG. 6 is a block diagram of a network architecture for multi-task learning with two classifiers, in accordance with certain example embodiments. As explained in greater detail below, the FIG. 6 approach incorporates both hard and soft parameter sharing.

As shown in FIG. 6, the training images $602a$-$602n$ are inputs to the face recognition neural network 604. In the FIG. 6 example, the face recognition neural network 604 is supported by the SqueezeNet convolutional neural network 606, which may be hosted on any suitable electronic device(s) (e.g., a computer, network or cloud computing environment, mobile device, and/or the like) including processing resources such as, for example, at least one hardware processor and a memory coupled thereto. The facial feature vectors 608 are the outputs of the last dense layer in that network 606, and they are later the inputs of the classifier network 610. If both the face recognition neural network 606 and the classifier network 610 are considered as a whole or integral system, the layers of the face recognition neural network are shared by all classification tasks, as in hard parameter sharing. The classifier network 610 may be supported by the same electronic device(s) as the face recognition neural network 604 and thus may share the same processing resources in some example implementations. In other example implementations, the two networks may be hosted by different computing platforms and thus make use of different respective processing resources, but they still may be considered a unitary system, at least in view of how processing is to take place, e.g., as described herein.

The multi-task learning classifier network 610 shows two classifiers, i.e., in the upper and lower rows. More particularly, one sub-network is built for each classifier, and each sub-network includes a four-layer fully-connected neural network in this example. Each classifier has three dense hidden layers 612a/612b/612c, 614a/614b/614c, and each hidden layer has 32 neurons. Dropout 616 is applied on the latter two hidden layers of each sub-network. The number of neurons and number of layers to which dropout may be applied are hyperparameters and, thus, may be different in other example embodiments. The last layer is the output layer 618a-618b, with the classifications (which in this example are female/male, and young/old). Although two classifiers are shown in the FIG. 6 example, as noted above, the techniques of certain example embodiments can be extended to more classifiers easily.

Between each layer, a cross-stitch layer 620a-620c is added. The cross-stitch layers 620a-620c are shared, crossing all sub-networks. This cross-stitching in essence helps implement soft parameter sharing. More particularly, the cross-stitch layers 620a-620c help describe the relationships between different tasks, and the network will learn how to optimize the relationships during training. A loss function may be implemented, e.g., as a sum of the softmax loss functions of all sub-networks. Example implementation details for cross-stitching will be set forth below. Cross-stitching is advantageous in certain example embodiments in that it permits shared and non-shared layers to be implemented and, in at least this sense, FIG. 6 helps blend together/leverage the strengths of FIGS. 4-5.

Feature vectors are generated for the images after training. For example, in the context of a login or authentication type application, after training, for a given face image of a user who wants to login, a feature vector is generated by the convolutional network. The generated vector then is used as an input of the multi-task learning network, with the outputs being the results of all classifiers. In this example, the output is the gender and age group of the face image.

Cross-stitching may be implemented as follows. Consider that an N-way tensor T with shape $(D_1, D_2 \ldots D_N)$ is an N-dimensional array containing $\Pi_{n=1}^{N} D_n$ elements. For example scalars, vectors, and matrices can be seen as 0, 1 and 2-way tensors.

1. The inputs are k N-way tensors with N>0 or, for example, two matrices with same shape (m, a, b).
2. Fix the first dimension and reshape the inputs to 2-way tensors. With the example before, each matrix will have shape (m, a×b).
3. Concatenate these 2-way tensors along the second axis to get a matrix X with shape (m, p). With the example before, p=a×b+a×b.
4. The parameters of the cross-stitch layer will be represented with a matrix A with shape (p, p). It is initialized with an identity matrix at the beginning of training.
5. Multiply the matrix X and A to apply linear transformation on inputs. The result is a matrix X'=XA with shape (m, p).
6. Reshape X' and split it into k tensors with the same shapes as inputs and output them.

The following is a more concrete example:
1. The inputs are two (k=2) matrices (2-way tensors)

$$\begin{bmatrix} 1 & 2 \\ 3 & 4 \end{bmatrix} \text{ and } \begin{bmatrix} 5 \\ 6 \end{bmatrix}$$

with shape (2, 2) and (2, 1) respectively, which are outputs of two sub network layers.
2. They are already 2-way tensors, so no reshape needed.
3. Concatenate them along the second axis and get the matrix $$X = \begin{bmatrix} 1 & 2 & 5 \\ 3 & 4 & 6 \end{bmatrix}.$$

4. The parameters of this cross-stitch layer is a 3 by 3 matrix in this case and are initialized as an identity matrix:

$$A = \begin{bmatrix} 1 & 0 & 0 \\ 0 & 1 & 0 \\ 0 & 0 & 1 \end{bmatrix}.$$

5.

$$X' = XA = \begin{bmatrix} 1 & 2 & 5 \\ 3 & 4 & 6 \end{bmatrix} \begin{bmatrix} 1 & 0 & 0 \\ 0 & 1 & 0 \\ 0 & 0 & 1 \end{bmatrix} = \begin{bmatrix} 1 & 2 & 5 \\ 3 & 4 & 6 \end{bmatrix}.$$

6. Reshape X' and split it into 2 tensors with the same shapes as input, so $$\begin{bmatrix} 1 & 2 \\ 3 & 4 \end{bmatrix} \text{ and } \begin{bmatrix} 5 \\ 6 \end{bmatrix}$$

are the outputs of this cross-stitch layer. They are the inputs of next sub-networks layers.

As shown above, with the initial parameters outputs are the same as inputs, which means at the beginning only identity transformation is applied and sub-networks that are connected to this cross-stitch layer are basically isolated. But during the training, the neural network will update the parameter matrix A in order to minimize the loss function. It will find a better transformation to mix the layers of sub-networks if the related sub tasks are indeed relevant.

In terms of training the classifiers, similar parameters, preprocessing operations, normalizations, etc., as those discussed above may be used, in connection with certain example embodiments. For instance, in this example, the facial feature vectors are standardized (e.g., with a z-score) before using them as input into the network. Parameters of the dense layers are initialized with He initialization, and bias is initialized with zero. Parameters of the cross-stitch layers are initialized with the identity matrix. In order to avoid overfitting, batch normalization and L2 regularization is applied on dense layers. Dropout has a keep probability of 0.8. The learning rate is set to 0.0003 constantly. The training took 900 periods with the batch size 128. These values also are hyperparameters and, thus, may vary in different example embodiments.

Figure 7:
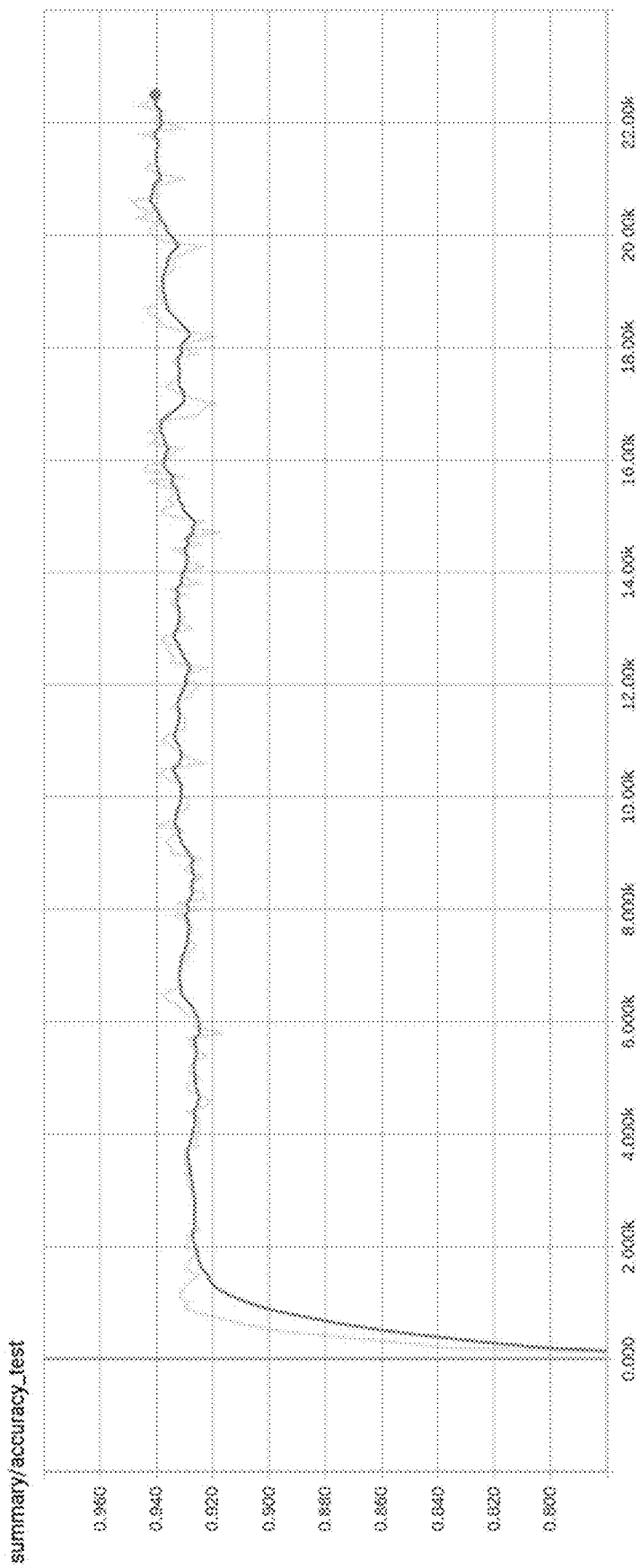
FIG. 7 shows the accuracy of the training process for the gender-age classifier in accordance with certain example embodiments.
Figure 8:
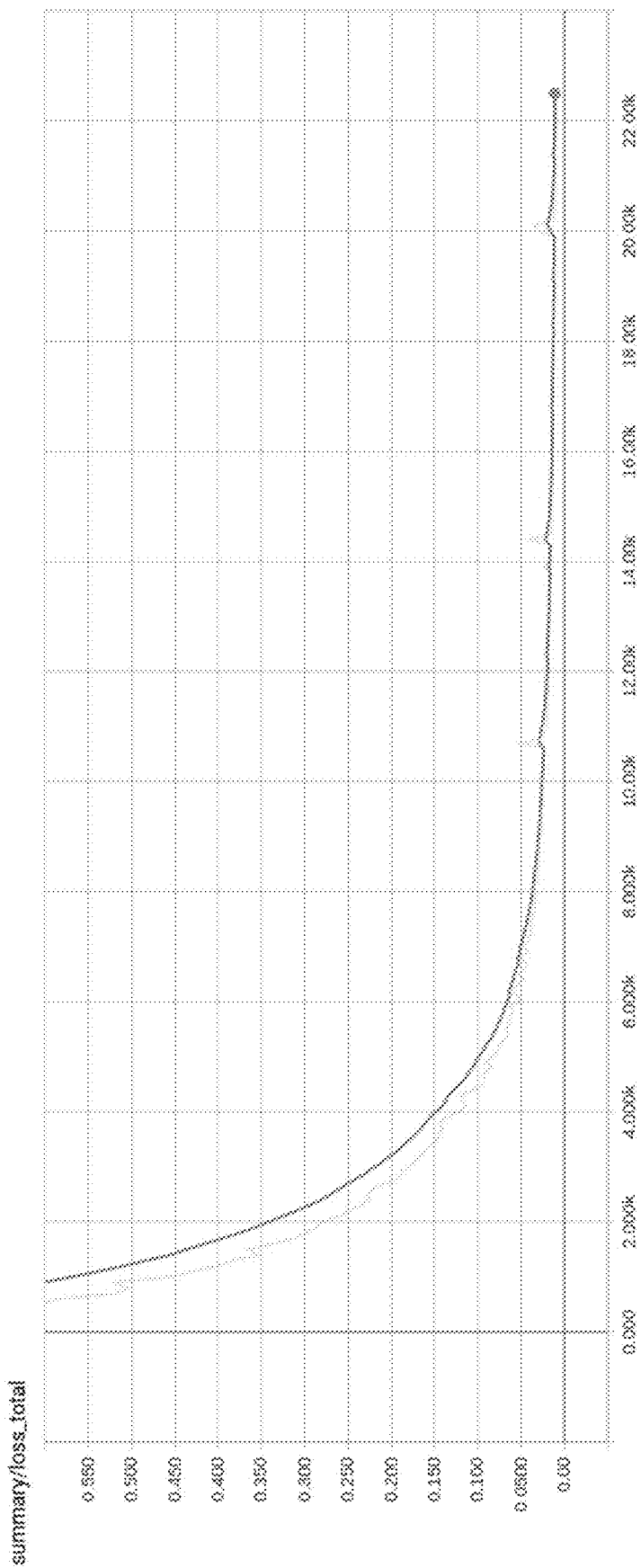
FIG. 8 shows the loss function value of the training process for the gender-age classifier in accordance with certain example embodiments.

After training, the network was tested with 200 images from the VGGFace2 database that were not used in the training. Their accuracies of gender classification and age classification were calculated and averaged. The final accuracy was found to be about 94%. In this regard, and similar to FIGS. 2-3, FIG. 7 shows the accuracy of the training process for the gender-age classifier in accordance with certain example embodiments; and FIG. 8 shows the loss function value of the training process for the gender-age classifier in accordance with certain example embodiments.

Figure 9:
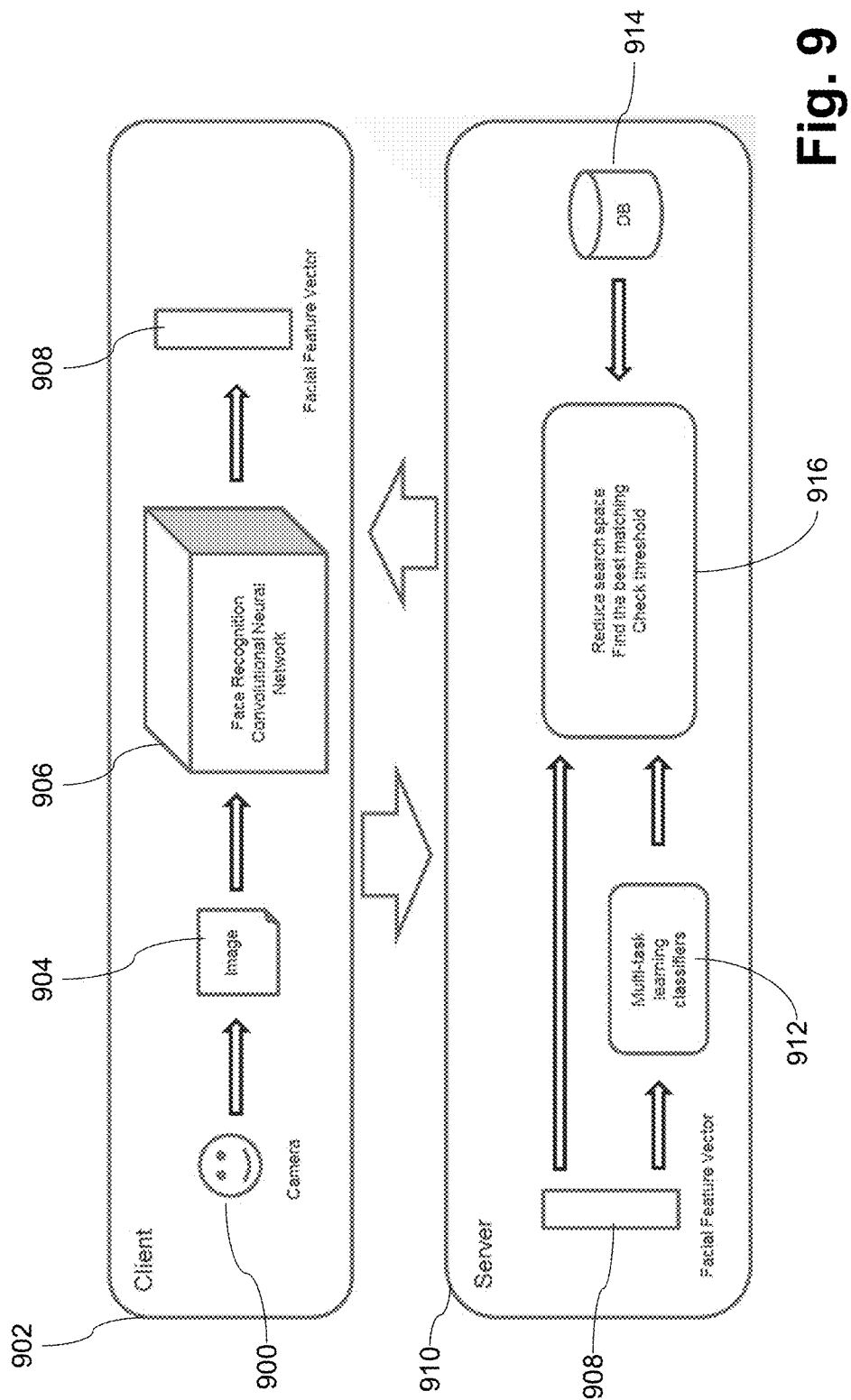
FIG. 9 is a block diagram of a facial recognition system built in accordance with certain example embodiments.

FIG. 9 is a block diagram of a facial recognition system built in accordance with certain example embodiments. On the client 902, a photo of a user is obtained (e.g., using a web camera 900 or the like). The image 904 of the face is then sent to the face recognition convolutional neural network 906. As a result, a 128-dimensional facial feature vector 908 is generated and sent to the server 910.

On the server 910, the vector 908 from the request is used as an input to the classifiers neural network 912. A database 914 stores, for registered users, facial feature vectors and face appearance related biologic information like gender and age. The outputs of classifiers 912 (the gender and age group of the user) and the facial feature vector 908 from the request are used to find out who the user is and whether the user can take appropriate actions using the system. This may be facilitated by reducing the search space via the matching and search program module 916, described in greater detail below.

It will be appreciated that the client 902 and server 910 each may be computing systems, with each including respective processing resources such as, for example, at least one processor and a memory coupled thereto. An application programming interface (API) or the like may be used to connect the camera 900 to the client 902. The client 902 and server 910 may communicate via any suitable means such as, for example, over a wired or wireless network such as, for example, the Internet. Different functionality may be implemented in different places. For instance, as shown in FIG. 9, a program executing on the client 902 may be responsible for capturing the image, generating a corresponding facial feature vector, transmitting the generated vector to the server 910 for further processing, receiving operational feedback from the server 910 (e.g., such as, for example, indicating whether the user is authenticated, enabling access to the program, etc.). Moreover, as shown in FIG. 9, a program executing on the server 910 may be responsible for receiving the generated vector from the client 902, running the vector through the classifiers 912, comparing the vector and classifier 912 output with information from the database 914, making an authentication or other decision, transmitting the output from that decision back to the client 902, etc. It will be appreciated that such functionality may be located in different configurations in different example embodiments. For instance, in an example embodiment, all or substantially all functionality may be implemented on the client 902, potentially with the server 910 being omitted in a more standalone version. In another example embodiment, the client 902 may be responsible only for capturing the image, transmitting it to the server 910 for processing by the face recognition convolutional neural network 906 located on the server 910, and receiving output from the server, e.g., in the form of an authentication-related message/operation.

Figure 10:
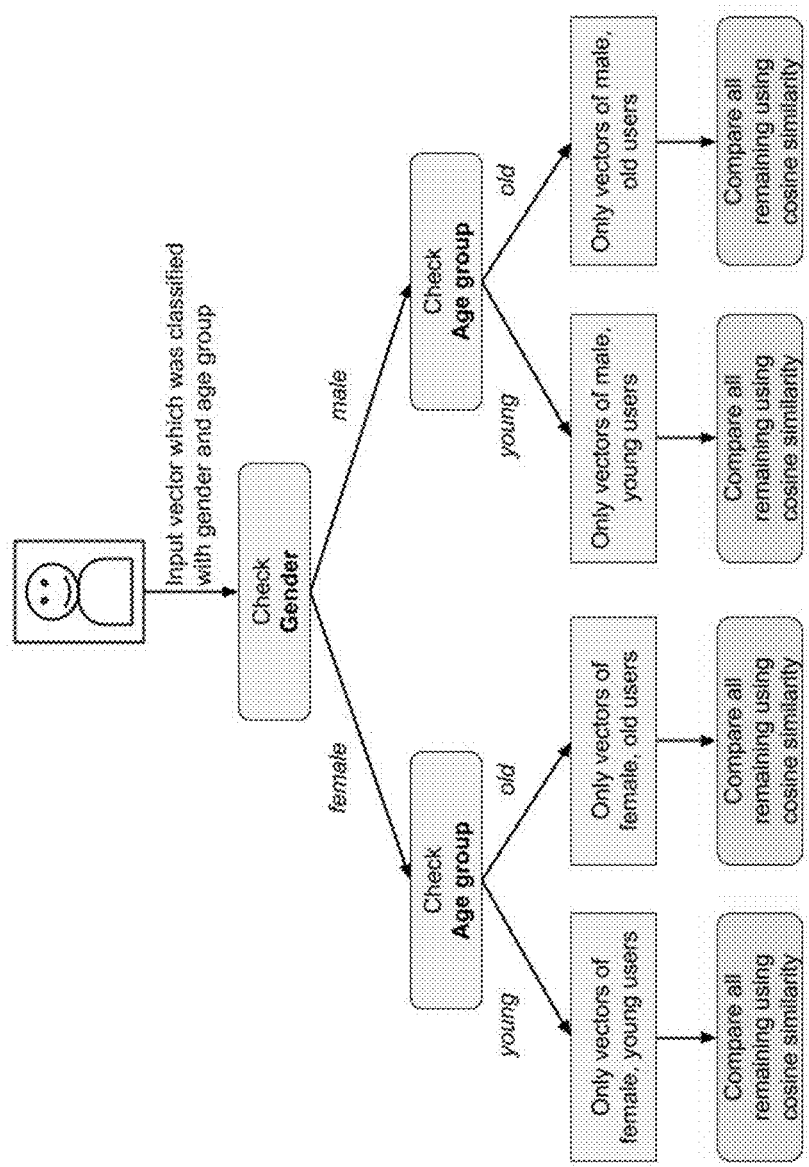
FIG. 10 is a diagram showing how the search space can be reduced by the classifiers' results, in accordance with certain example embodiments.

FIG. 10 is a diagram showing how the search space can be reduced by the classifiers' results, in accordance with certain example embodiments. As shown in FIG. 10, with the help of classifiers, the search space for the vector matching is reduced to one-quarter, on average. Based on user's gender and age, unrelated data is filtered out before checking the vectors. Such filtering can be performed in the database itself and typically will be much faster than vector matching. In certain example embodiments, only the remaining vectors (the vectors not filtered out/the vectors filtered in) are considered in connection with the vector matching. The one remaining vector with the highest cosine similarity is selected, e.g., after a linear or other search. If the degree of similarity is larger than a defined threshold, the system considers the vector to be a match. For an authentication or login type system, the user may be logged in, etc.; otherwise, the login attempt fails. The response is sent back to client in certain example embodiments.

In terms of maintaining the database, at the initialization phase, face images of registered users are sent to the face recognition network described above, and facial feature vectors are extracted and saved in database. Other face appearance related biologic information like gender and age is also stored in database in certain example embodiments. This information may be recorded manually, generated automatically (e.g., with manual check and corrections in some instances) by the multi-task learning classifier described before, etc. The database may be updated to add and/or remove users, and the face recognition network and multi-task learning classifiers do not need to be trained again.

Because the filtered-out space is not checked during feature vector matching, the accuracies of the facial feature classifiers are important. In comparison with 3.31 million training images for the face recognition convolutional neural network, the gender-age network was trained with only 1,800 images as explained above and was found to have an average accuracy of about 94%. The labeled images were sufficient for this example, but in different contexts more training data may be needed to improve the accuracy yet further.

As will be appreciated from the example above, only two binary classifiers were used. However, in different example embodiments, more classifiers can be implemented. Including additional classifiers may be advantageous as it may accelerate the vector matching yet further in some instances. In addition, or in the alternative, multi-class classifiers (e.g., where the possible output classes are more than two, as may be the case for age of people in their 30s, 40s, 50s, etc.; race; etc.) may in some instances reduce the search space more than binary classifiers. Thus, it will be appreciated that the classifiers may be binary, ternary, etc., in different example embodiments.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A facial recognition system, comprising:
a data store storing reference facial feature vectors and associated classification features; and
processing resources including at least one hardware processor and a memory coupled thereto, the processing resources being configured to support:
a face recognition neural network configured to generate facial feature vectors for faces in images received via an interface; and
a multi-task learning classifier network configured to receive facial feature vectors generated by the face recognition neural network and output a plurality of classifications based on the facial feature vectors for the corresponding images, wherein the classifications are built by respective sub-networks each comprising a plurality of classification layers arranged in levels, and wherein the classification layers in at least some of the levels receive as input intermediate outputs from an immediately upstream classification layer in the same sub-network and an immediately upstream classification layer in each other sub-network;
wherein the processing resources are configured to control at least a part of the facial recognition system to at least:
receive from the face recognition neural network a resultant facial feature vector corresponding to an input image received via the interface;
receive from the multi-task learning classifier network a plurality of resultant classifiers for the input image and based at least in part on the resultant facial feature vector;
search the data store for a subset of reference facial feature vectors, the subset of reference facial feature vectors having associated classification features matching the resultant classifiers; and
perform vector matching to identify which one(s) of the reference facial feature vectors in the subset of reference facial feature vectors most closely match(es) the resultant facial feature vector.

2. The system of claim 1, further comprising a camera, wherein the interface provides a connection to the camera.

3. The system of claim 1, wherein the sub-networks are binary classifiers.

4. The system of claim 1, wherein the multi-task learning classifier network includes two different sub-networks.

5. The system of claim 1, wherein the processing resources are configured to facilitate hard parameter sharing between the face recognition neural network and the multi-task learning classifier network, and soft parameter sharing between sub-networks in the multi-task learning classifier network.

6. The system of claim 1, wherein each sub-network has four levels.

7. The system of claim 1, wherein the classification layers in the second through penultimate levels receive as input intermediate outputs from an immediately upstream classification layer in the same sub-network and an immediately upstream classification layer in each other sub-network.

8. The system of claim 1, further comprising a client device and a server device connected to one another via a network connection, the face recognition neural network being implemented on the client device and the multi-task learning classifier network being implemented on the server device.

9. The system of claim 8, wherein the searching and the vector matching are implemented on the server device.

10. The system of claim 1, wherein:
the input image is received in connection with an authentication request;
the reference facial feature vectors and associated classification features in the data store correspond to known users; and
the processing resources are further configured to control at least a part of the facial recognition system to at least determine whether the one(s) of the reference facial feature vectors in the subset of reference facial feature vectors most closely match(es) the resultant facial feature vector exceeds a defined threshold and, conditioned upon that determination being satisfied, issue an authentication command.

11. The system of claim 1, wherein:
the vector matching is performed in connection with a cosine similarity calculation; and
the processing resources are further configured to control at least a part of the facial recognition system to at least determine whether the one(s) of the reference facial feature vectors in the subset of reference facial feature vectors most closely match(es) the resultant facial feature vector exceeds a defined threshold and, conditioned upon that determination being satisfied, issue a predefined command or instruction.

12. The system of claim 1, wherein intermediate outputs from one sub-network are transformed prior to processing by another sub-network.

13. The system of claim 1, wherein the face recognition neural network and the multi-task learning classifier network are separately trained.

14. The system of claim 1, wherein the processing resources are further configured to control at least a part of the facial recognition system to at least normalize training images used to train the face recognition neural network and/or the multi-task learning classifier network.

15. The system of claim 14, wherein the normalizing comprises detecting and cutting face areas for the training images, and selectively resizing the cut face areas so that the cut face areas are of a common size.

16. The system of claim 1, wherein the multi-task learning classifier network is trained with data from a subset of the training images, the subset including classification labels corresponding to classifications that can be output by the multi-task learning classifier network.

17. The system of claim 1, wherein the face recognition neural network is a convolutional neural network trainable in connection with a softmax loss function, or variant thereof.

18. The system of claim 1, wherein the data store is a database.

19. The system of claim 18, wherein the search is performed by the database and within the database.

20. A facial recognition system, comprising:
a data store storing reference facial feature vectors and associated classification features; and processing resources including at least one hardware processor and a memory coupled thereto, the processing resources being configured to support:
  a face recognition neural network configured to generate facial feature vectors for faces in images received via an interface, the generated facial feature vectors having fewer than 512 dimensions; and
  a multi-task learning classifier neural network configured to receive facial feature vectors generated by the face recognition neural network and output a plurality of classifications based on the facial feature vectors for the corresponding images, wherein the classifications are built by respective sub-networks each comprising a plurality of classification layers arranged in levels, and wherein the classification layers in at least some of the levels receive as input intermediate outputs from an immediately upstream classification layer in the same sub-network and an immediately upstream classification layer in each other sub-network;
wherein the face recognition neural network and the multi-task learning classifier neural network are separately trained; and
wherein the multi-task learning classifier neural network is trained with data from a subset of training images used to train the face recognition neural network, the subset including classification labels corresponding to classifications that can be output by the multi-task learning classifier neural network.

21. A facial recognition system, comprising:
a database storing reference facial feature vectors and associated classification features; and
processing resources including at least one hardware processor and a memory coupled thereto, the processing resources being configured to support:
  a face recognition neural network configured to generate facial feature vectors for faces in images received from the camera, the generated facial feature vectors having fewer than 512 dimensions; and
  a multi-task learning classifier neural network configured to receive facial feature vectors generated by the face recognition neural network and output a plurality of classifications based on the facial feature vectors for the corresponding images, wherein the classifications are built by respective sub-networks that implement soft parameter sharing therebetween;
wherein the processing resources are configured to control at least a part of the facial recognition system to at least:
  receive from the face recognition neural network a resultant facial feature vector corresponding to an input image received from the camera;
  receive from the multi-task learning classifier neural network a plurality of resultant classifiers for the input image and based at least in part on the resultant facial feature vector;
  search the database for a subset of reference facial feature vectors, the subset of reference facial feature vectors having associated classification features matching the resultant classifiers; and
  identify which one(s) of the reference facial feature vectors in the subset of reference facial feature vectors most closely match(es) the resultant facial feature vector;
wherein the face recognition neural network and the multi-task learning classifier neural network are separately trained; and
wherein the multi-task learning classifier neural network is trained with data from a subset of training images used to train the face recognition neural network, the subset including classification labels corresponding to classifications that can be output by the multi-task learning neural classifier network.

22. A method of operating a facial recognition system, the system comprising a data store storing reference facial feature vectors and associated classification features, the system supporting a face recognition neural network configured to generate facial feature vectors for faces in images received via an interface and a multi-task learning classifier network configured to receive facial feature vectors generated by the face recognition neural network and output a plurality of classifications based on the facial feature vectors for the corresponding images, wherein the classifications are built by respective sub-networks each comprising a plurality of classification layers arranged in levels, and wherein the classification layers in at least some of the levels receive as input intermediate outputs from an immediately upstream classification layer in the same sub-network and an immediately upstream classification layer in each other sub-network, the method comprising:
  receiving from the face recognition neural network a resultant facial feature vector corresponding to an input image received via the interface;
  receiving from the multi-task learning classifier network a plurality of resultant classifiers for the input image and based at least in part on the resultant facial feature vector;
  searching the data store for a subset of reference facial feature vectors, the subset of reference facial feature vectors having associated classification features matching the resultant classifiers; and
  performing vector matching to identify which one(s) of the reference facial feature vectors in the subset of reference facial feature vectors most closely match(es) the resultant facial feature vector.

23. A method of training a facial recognition system, the method comprising:
  building a data store storing reference facial feature vectors and associated classification features;
  training a face recognition neural network configured to generate facial feature vectors for faces in images received via an interface; and
  training a multi-task learning classifier network configured to receive facial feature vectors generated by the face recognition neural network and output a plurality of classifications based on the facial feature vectors for the corresponding images, wherein the classifications are built by respective sub-networks each comprising a plurality of classification layers arranged in levels, and wherein the classification layers in at least some of the levels receive as input intermediate outputs from an immediately upstream classification layer in the same sub-network and an immediately upstream classification layer in each other sub-network; wherein the facial recognition system, once trained, is configured to at least:
  receive from the face recognition neural network a resultant facial feature vector corresponding to an input image received via the interface;
  receive from the multi-task learning classifier network a plurality of resultant classifiers for the input image and based at least in part on the resultant facial feature vector;

search the data store for a subset of reference facial feature vectors, the subset of reference facial feature vectors having associated classification features matching the resultant classifiers; and perform vector matching to identify which one(s) of the reference facial feature vectors in the subset of reference facial feature vectors most closely match(es) the resultant facial feature vector.

24. A non-transitory computer readable storage medium tangibly storing a program that, when executed by a processor of a computing system, performs the method of claim 22.

25. A non-transitory computer readable storage medium tangibly storing a program that, when executed by a processor of a computing system, performs the method of claim 23.

* * * * *